United States Patent
Ichiyama

(10) Patent No.: US 6,493,181 B1
(45) Date of Patent: Dec. 10, 2002

(54) THRUST HYDRODYNAMIC BEARING, SPINDLE MOTOR PROVIDED THEREWITH, AND DISK DRIVE UTILIZING THE MOTOR

(75) Inventor: Yoshikazu Ichiyama, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 09/682,438

(22) Filed: Sep. 1, 2001

(30) Foreign Application Priority Data

Sep. 1, 2001 (JP) .......................... 2000-265709

(51) Int. Cl.[7] .......................... G11B 17/02; F16C 32/06
(52) U.S. Cl. .................. 360/99.08; 360/98.07; 384/123
(58) Field of Search .......................... 360/98.07, 99.08, 360/99.04, 97.01, 98.01; 384/112, 121, 123, 107

(56) References Cited

U.S. PATENT DOCUMENTS

| | | | | |
|---|---|---|---|---|
| 5,427,456 A | * | 6/1995 | Hensel | 384/112 |
| 5,536,088 A | * | 7/1996 | Cheever et al. | 384/107 |
| 5,806,987 A | * | 9/1998 | Nose et al. | 384/100 |
| 6,059,459 A | * | 5/2000 | Ichiyama | 384/112 |
| 6,066,903 A | * | 5/2000 | Ichiyama | 310/90 |
| 6,264,368 B1 | * | 7/2001 | Tanaka et al | 384/112 |
| 6,296,391 B1 | * | 10/2001 | Hayakawa et al. | 384/119 |
| 6,361,214 B1 | * | 3/2002 | Ichiyama | 384/107 |

* cited by examiner

Primary Examiner—Jefferson Evans
(74) Attorney, Agent, or Firm—James Judge

(57) ABSTRACT

In a thrust dynamic-pressure bearing that through pump-in type spiral grooves generates dynamic pressure, a simple configuration to eliminate at the bearing exterior air bubbles liable to build up nearby the central portion of the bearing, yielding stabilized axial bearing force. The configuration lends superior endurance and reliability to the thrust bearing, and to a spindle motor furnished with the bearing. The configuration makes the circularly symmetrical dynamic pressure distribution, created by spiral grooves formed circularly symmetrical with respect to the bearing axial center, asymmetrical by the addition of an asymmetrical auxiliary groove(s). Air bubbles building up near the center of the spiral grooves are thus shifted to the area where the spiral grooves are formed. In the area where the spiral grooves are formed, the more inward the oil the higher the dynamic pressure. Therefore, because air bubbles will tend to shift from a region of high to a region of low oil pressure, the air bubbles get pushed out to the outer circumferential margin of the spiral grooves.

8 Claims, 8 Drawing Sheets

THRUST HYDRODYNAMIC BEARING, SPINDLE MOTOR PROVIDED THEREWITH, AND DISK DRIVE UTILIZING THE MOTOR

BACKGROUND OF INVENTION

The present invention relates to a thrust hydrodynamic bearing, to a spindle motor equipped with the thrust hydrodynamic bearing, and to a disk drive utilizing the spindle motor, that are capable of eliminating air bubbles that can build up nearby the bearing center.

Spindle motors for driving recording disks such as hard disks include bearing means for supporting axial loads that act on the rotor. Thrust hydrodynamic bearings are conventionally employed as the axial load bearing means. In a fluid such as oil, retained between two axially opposing planar surfaces, thrust hydrodynamic bearings generate dynamic pressure when the rotor rotates. The hydrodynamically generated thrust pressure serves as the axial load bearing pressure.

FIG. 7 depicts a conventional thrust hydrodynamic bearing 1. The dynamic-pressure generating grooves formed in this conventional thrust bearing 1 for generating hydrodynamic pressure are so-called pump-in type spiral grooves 2, which induce radially inward acting dynamic pressure in the oil. By virtue of the spiral grooves, nearby the bearing center a pressure peak where the dynamic pressure becomes quite large appears, while heading radially outward the pressure declines. This pressure peak area in the dynamic bearing supports loads acting on the rotor.

The spiral grooves 2 develop dynamic pressure with comparatively better energy efficiency than herringbone grooves formed by two sets of spiral grooves in combination. In addition, the spiral grooves 2 make diametric reduction of the thrust hydrodynamic bearing 1 possible, which lets the motor be run at low peripheral speeds, and which is a way to decrease bearing losses.

Nevertheless, air bubbles will eventually become present in the area where the spiral grooves 2 are formed. The air bubbles will shift from the high end to the low end along the pressure gradient at which the thrust bearing 1 generates dynamic pressure. Accordingly, the air bubbles shift radially outward, toward where the pressure is lower. Herein, one way to exhaust the air bubbles to the bearing exterior is to arrange a communicating hole in the radially outward area of the bearing, as a communication to the bearing exterior. Because the bearing pressure distribution develops with axial symmetry, however, in the bearing center vicinity there will only be a slight pressure gradient. Despite the communicating hole, therefore, the air bubbles that eventually will be present nearby the center are less likely to be eliminated.

When air bubbles build up like this nearby the center of the bearing under a higher-temperature environment, they increase in volume because the coefficient of thermal expansion of the air bubbles is greater than that of the oil. The expanding air bubbles cause the oil to effuse to the bearing exterior. A similar phenomenon occurs even under a lower-temperature environment. Effusion of oil decreases the amount of oil retained in the bearing. Consequently the rigidity of the bearing declines and moreover the oil reserve depletes prematurely; and other problems, such as deterioration in endurance and degradation in reliability of the bearing, arise.

SUMMARY OF INVENTION

An object of the present invention is to eliminate air bubbles liable to build up nearby the bearing center, and thereby to yield stabilized axial bearing force, in a thrust hydrodynamic bearing in which dynamic pressure is generated by pump-in type spiral grooves.

Yet another object of the present invention is with a simple structure to eliminate to the bearing exterior air bubbles liable to build up nearby the center of a pump-in type thrust hydrodynamic bearing.

A still further object of the invention is to structure a pump-in type thrust hydrodynamic bearing for superior endurance and reliability of the bearing, and of a spindle motor furnished with the bearing.

An additional object is to provide a disk drive that operates stably over the long term.

In order to achieve the foregoing objects, in a pump-in type thrust hydrodynamic bearing construction according to the present invention an asymmetrical auxiliary groove is added to spiral grooves formed circularly symmetrical with respect to the axial center. The addition of the asymmetrical auxiliary groove makes the circularly symmetrical pressure distribution created by the spiral grooves asymmetrical. Air bubbles building up nearby the center of the spiral grooves are thereby shifted to the area where the spiral grooves are formed. Around the inside of the area where the spiral grooves are formed, the dynamic pressure of the oil will be high. Air bubbles in a hydraulic fluid tend to shift from a region where the fluid pressure is high to a region where the fluid pressure is low. Owing to this tendency, air bubbles inside the area where the spiral grooves are formed get pushed out beyond the periphery.

This accordingly is a way surely and readily to eliminate air bubbles intermixing with the oil. Thus eliminating air bubbles lets movement of oil in the direction of the bearing center by virtue of the pump-in type spiral grooves occur smoothly, which yields stabilized axial bearing force. In addition, oil leakage from the bearings occurring due to air bubbles is effectively checked, which improves the bearing reliability and endurance.

As far as manufacturing is concerned the spiral grooves and/or the auxiliary groove can by formed by electrochemical machining, cutting, or pressworking processes. Further, the auxiliary groove should be of a shape or configuration that makes the pressure distribution that the spiral grooves develop asymmetric with respect to the axial center. For example, the auxiliary groove may be straight or circularly arcuate, and positioned radially inward of the spiral grooves, asymmetric with respect to the axial center and having a radially outward end from which the auxiliary groove extends towards the bearing center. Alternatively, the auxiliary groove may be formed by extending radially inward a part of the inner edge of the spiral grooves. Furthermore, furnishing in the outer margin of the thrust plate a communication hole that communicates with the bearing exterior is a way to exhaust air bubbles pushed out beyond the periphery of the spiral grooves.

In addition, the present invention can be realized as a spindle motor having a thrust bearing as described above. Spindle motors thus embodied may be employed in spindle motor applications for driving magnetic disks such as hard disks, magneto-optical disks, optical disks such as CD-ROMs and DVDs, and like recording disks. These spindle motors could be used under various environments, particularly in high-temperature, low-pressure environments. Air assimilated into oil under a high-temperature, low-pressure environment is liable to turn into bubbles. Air bubbles generated within the oil are eliminated surely and readily by establishing an auxiliary groove like the foregoing, associated with the thrust bearing spiral grooves. Consequently, problems originating in air bubbles, such as oil effusion and degradation in bearing rigidity, are effectively averted.

From the following detailed description in conjunction with the accompanying drawings, the foregoing and other objects, features, aspects and advantages of the present invention will become readily apparent to those skilled in the art.

DETAILED DESCRIPTION

Figure 8:
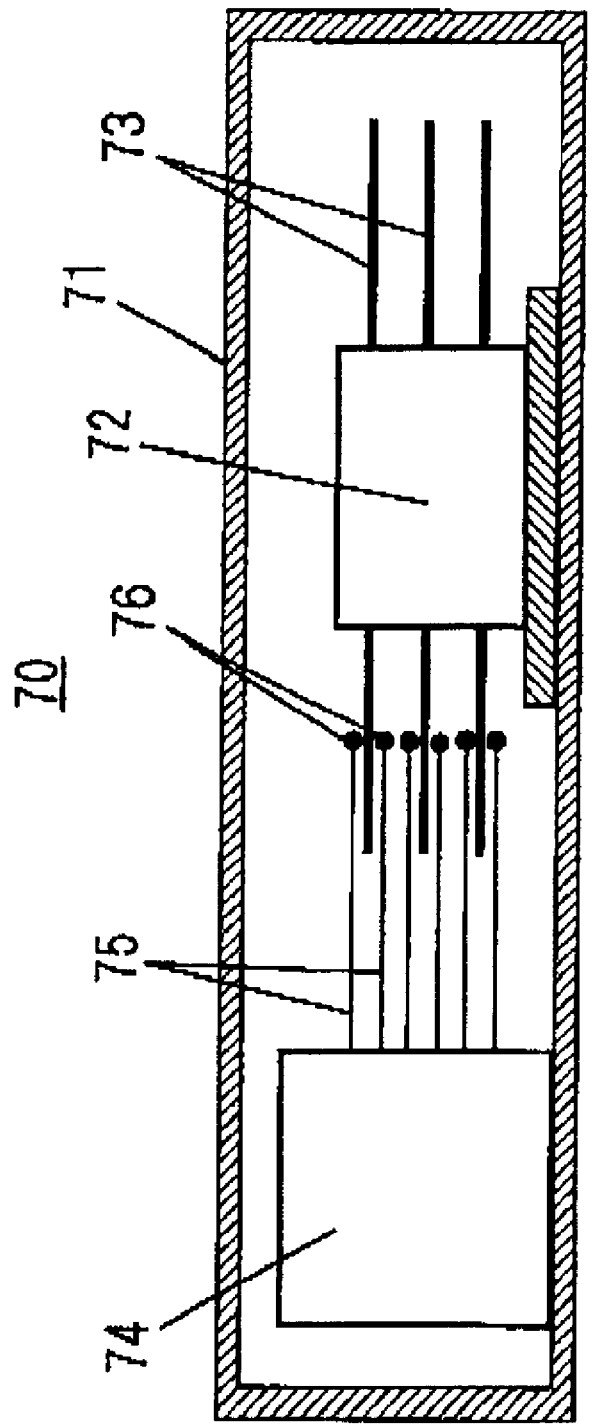
FIG. 8 is a diagram schematically representing a general disk drive in section.

Reference is made initially to FIG. 8, schematically diagramming the internal configuration of a general disk drive. The interior of its housing 71 is formed as a clean space in which dirt/dust is extremely slight. A spindle motor 72 onto which information-recording disks are mounted is installed within the clean space. In addition, a head-shifting mechanism 77 for reading/writing information from/onto the disks 73 is installed within the housing. The head-shifting mechanism 77 is composed of: heads 76 for reading/writing disk information; arms 75 for supporting the heads 76; and an actuator 74 for shifting the heads 76 on the arms 75 into requisite disk positions.

With reference then to FIGS. 1 through 6, the following describes embodiments of the present invention. For the following description, the illustrated spindle motor and hydrodynamic bearing depict an example in which the present invention is applied to a disk-drive spindle motor, which may be the motor 72 just mentioned.

Figure 1:
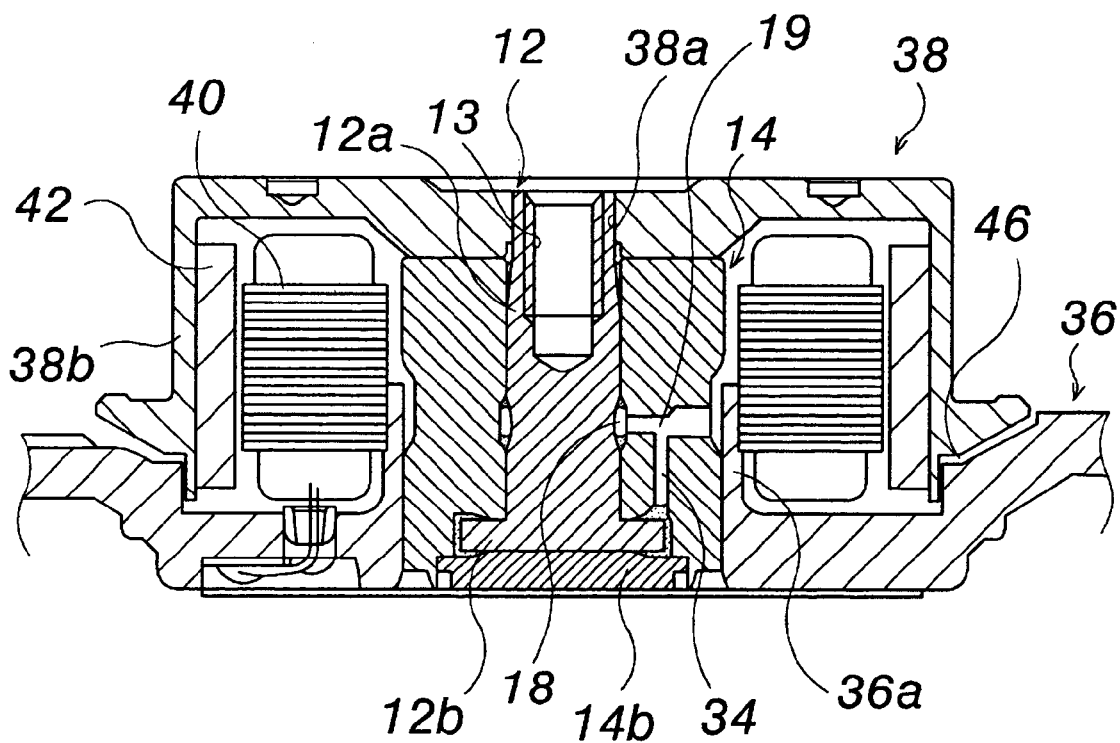
FIG. 1 is an elevational section view illustrating the configurational outline of a spindle motor in the present invention.
Figure 2:
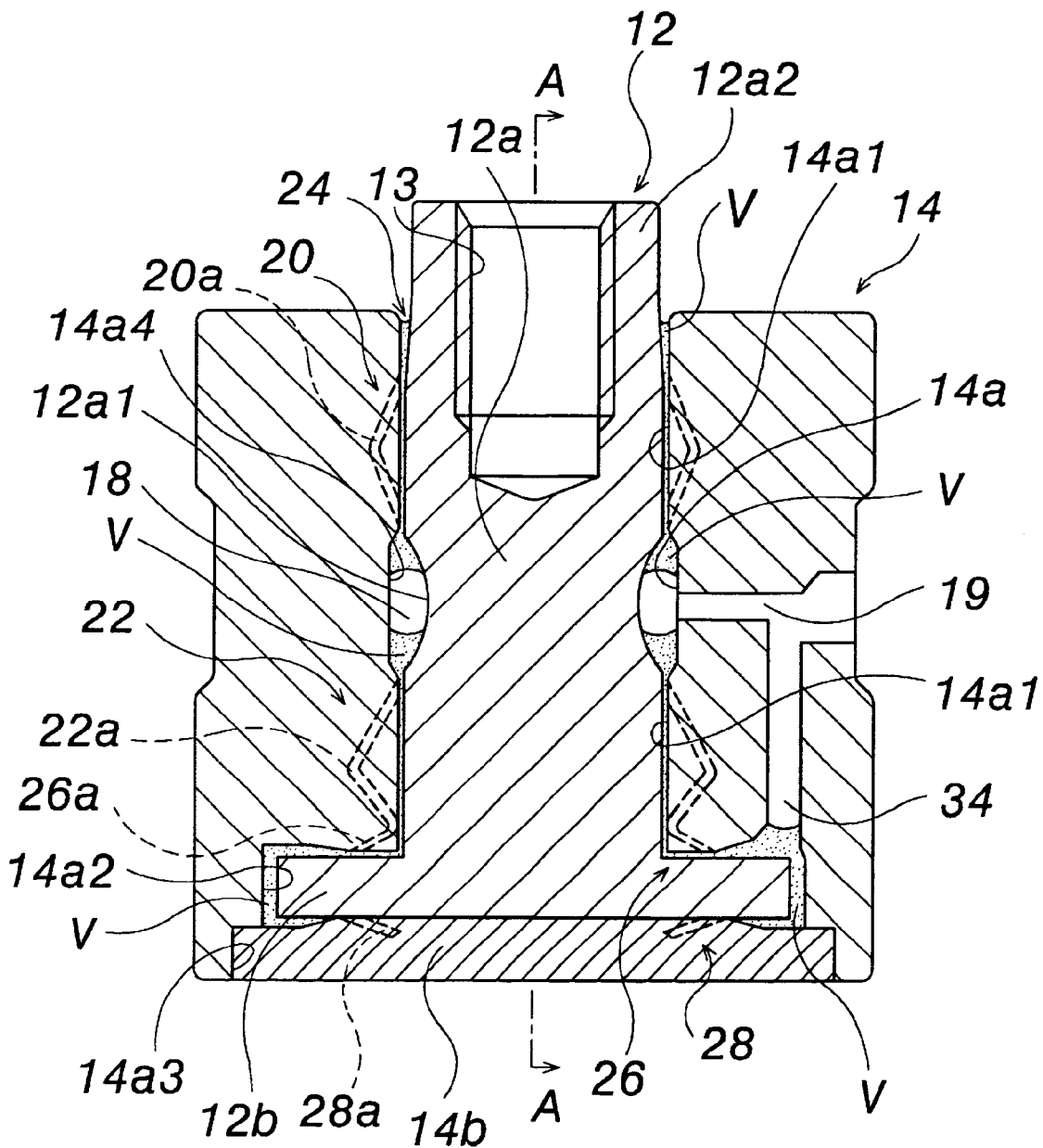
FIG. 2 is a partial section view of the bearing portion of the spindle motor, enlarged from FIG. 1.

FIG. 1 is a section through a spindle motor in which the present invention is adapted, giving an overview of the motor configuration. FIG. 2 then illustrates the bearing portion of the spindle motor, removed from the FIG. 1 section and enlarged for detail. Shown likewise in FIGS. 1 and 2, a shaft 12a and an annular thrust plate 12b located at the bottom end of the shaft 12a integrally form a rotary shaft part 12. An annular recess 12a1 circularly arcuate in cross-section is formed in the outer circumferential surface of the shaft 12a at an axially intermediate portion. The outer diameter of the shaft 12a heading upward gradually contracts; i.e., the shaft 12a is slightly tapered along the upper-end outer circumferential surface. A smaller outer diameter portion 12a2 is formed continuous with the tapered portion of the shaft 12a. The smaller outer diameter portion 12a2 is fixed to the inner circumferential surface of an installation hole 38a in a cap-shaped rotor hub 38. A rotor magnet 42 is mounted on the inner circumferential surface of an outer circumferential wall portion 38b of the rotor hub 38.

An upward-opening, male-threaded hole 13 oriented axially is furnished in the shaft 12a. A clamp element (not illustrated) for retaining hard disks (also not illustrated), loaded around the outer surface of the rotor hub 38 circumferential wall portion 38b, is screwed fast by a screw (again, not illustrated) fitted into the hole 13.

The rotary shaft part 12 is accommodated within a stationary sleeve 14. The sleeve 14 is formed axially penetrated by a central hole 14a made up of upper/lower smaller inner-diameter portions 14a1, a medium inner diameter portion 14a2, a larger inner-diameter portion 14a3, as well as an annular channel 14a4. Portions 14a1 oppose the outer circumferential surface of the shaft 12a via micro-gaps. Portion 14a2 is where the hole 14a radially enlarges to oppose the thrust plate 12b along its outer circumferential surface. Portion 14a3 is where the hole 14a radially enlarges further from portion 14a2. The annular channel 14a4, whose bottom is flat in cross-section, is in a position along the hole 14a that divides the portions 14a1 into upper and lower. The lower end opening of the hole 14a is closed off by a counter-plate 14b that mates exteriorly with the inner circumferential surface of the large inner diameter portion 14a2, wherein the counter-plate 14b is fixedly fitted. The upper end opening of the hole 14a is open to the external atmosphere in a tapered area 24 defined between the tapered portion of the shaft 12a, and the inner circumferential surface of the radially opposing sleeve portion 14a1. Finally, the sleeve 14 along its outer periphery is fitted into the inner circumferential surface of an annular cylindrical wall 36a furnished on a bracket 36.

A stator 40 is installed on the outer circumferential periphery of the annular wall 36a, in radial opposition to the rotor magnets 42.

A radial gap enlargement 18 is defined between the annular recess 12a1 and the annular channel 14a4. An intermediate vent hole 19 that, opening on the annular channel 14a4 and the outer circumferential surface of the sleeve 14, opens the radial gap enlargement 18 to the bearing exterior, is provided on the sleeve 14. Air taken in through the intermediate vent hole 19 is retained in the radial gap enlargement 18.

Oil Vis retained axially above and below the radial gap enlargement 18, between the outer circumferential surface of the shaft 12a and the inner circumferential surface of the smaller inner-diameter portions 14a1 of the central hole 14a. In these respective areas, an upper radial bearing 20 and a lower radial bearing 22 are constituted.

The tapered area 24, which as described earlier is defined between the tapered portion of the shaft 12a and the inner circumferential surface of the sleeve portion 14a1, is located at the upper end of the upper radial bearing 20. In the tapered area 24, the radial dimension of the gap between the inner circumferential surface of the sleeve portion 14a1 and the outer circumferential surface of the shaft 12a gradually enlarges heading axially upward. The earlier described annular recess 12a1 in the outer circumferential surface of the shaft 12a is located at the lower end of the upper radial bearing 20. The radial gap enlargement 18, defined, as noted earlier, between the annular recess 12a1 and the annular channel 14a4 gradually contracts in dimension going axially upward/downward from where the intermediate vent hole 19 in the sleeve portion 14a1 opens. The interfaces between the oil V retained in the upper radial bearing 20 and the external air form in the positions where external-air surface tension pressures acting respectively on the oil V in the tapered area 24, and in the radial gap enlargement 18, balance.

When due to long-term use the oil V retained in the upper radial bearing 20 has decreased, oil V retained in the tapered area 24 and the radial gap enlargement 18 will replenish the upper radial bearing 20.

The radial gap enlargement 18 meanwhile is located at the upper end of the lower radial bearing 22. The upper end interface on the oil V retained in the lower radial bearing 22 is located beneath where the intermediate vent hole 19 opens on the radial gap enlargement 18.

Figure 3:
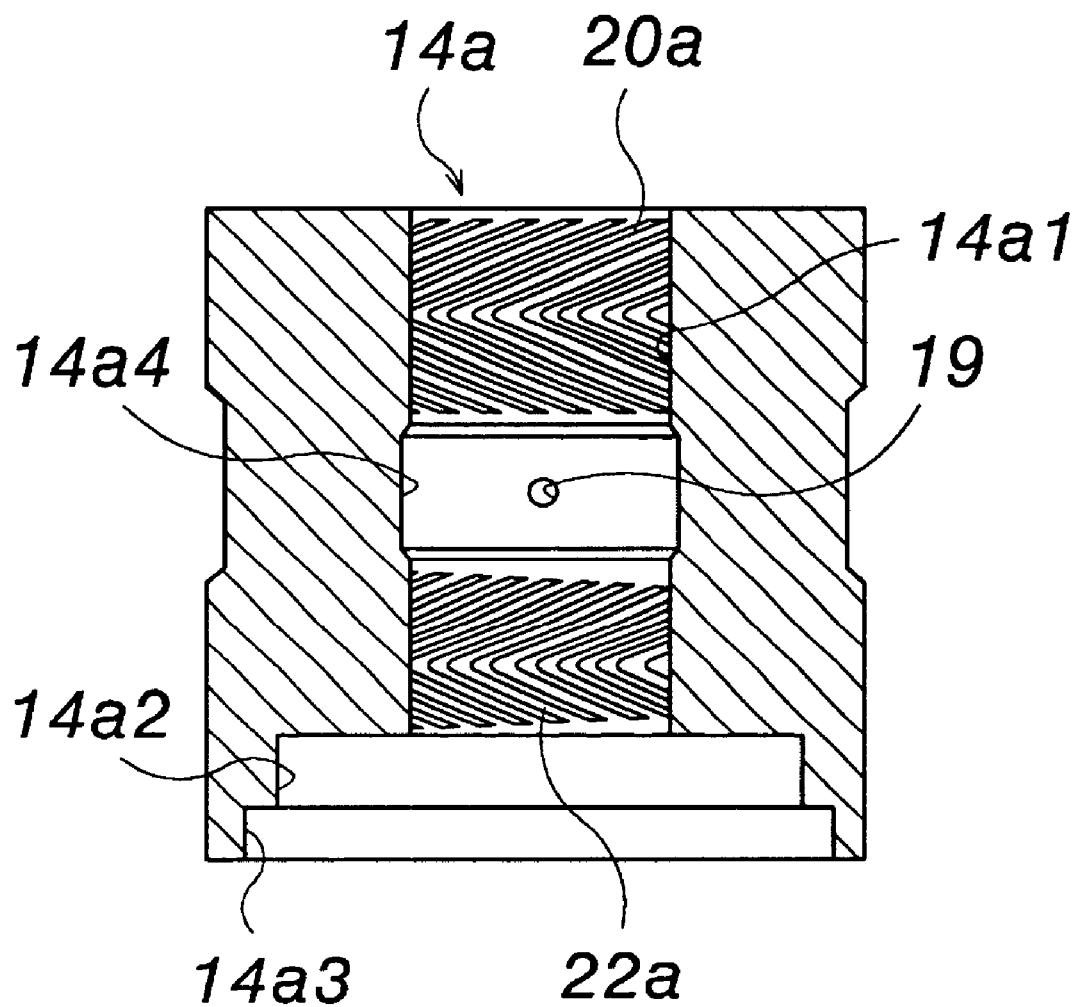
FIG. 3 is a section view through the spindle motor sleeve, taken along A—A in FIG. 2 and seen in the direction of the arrows.

FIG. 3 depicts the sleeve 14 with the rotary shaft part 12 and counter-plate 14b removed, in a section taken along A—A through the spindle motor bearing portion shown in FIG. 2. Herringbone grooves 20a are furnished on the inner circumferential surface of the smaller inner-diameter portion 14a1 in the upper end of the sleeve 14. The herringbone grooves 20a are axially symmetrical, formed so that the part where the grooves fold over corresponds to the axially mid position in the upper radial bearing 20. Rotation of the rotary shaft part 12 then generates oil dynamic pressure that acts heading from either marginal end (axially upper/lower ends) of the herringbone grooves 20a to where the grooves fold over. That is, the upper radial bearing 20 configuration generates a pressure peak in the axially mid position, and leaves the pressure lowest at either end.

On the other hand, herringbone grooves 22a are furnished on the inner circumferential surface of the smaller inner-diameter portion 14a1 in the lower end of the sleeve 14. The herringbone grooves 22a are axially asymmetrical, formed so that the part where the grooves fold over is biased downward in the lower radial bearing 22. Rotation of the rotary shaft part 12 then generates oil dynamic pressure that acts heading from either marginal end (axially upper/lower ends) of the herringbone grooves 22a to where the grooves fold over. That is, the lower radial bearing 22 configuration generates oil dynamic pressure having a pressure peak nearby the axially lower end, and leaves the pressure lowest at the upper end.

Figure 4:
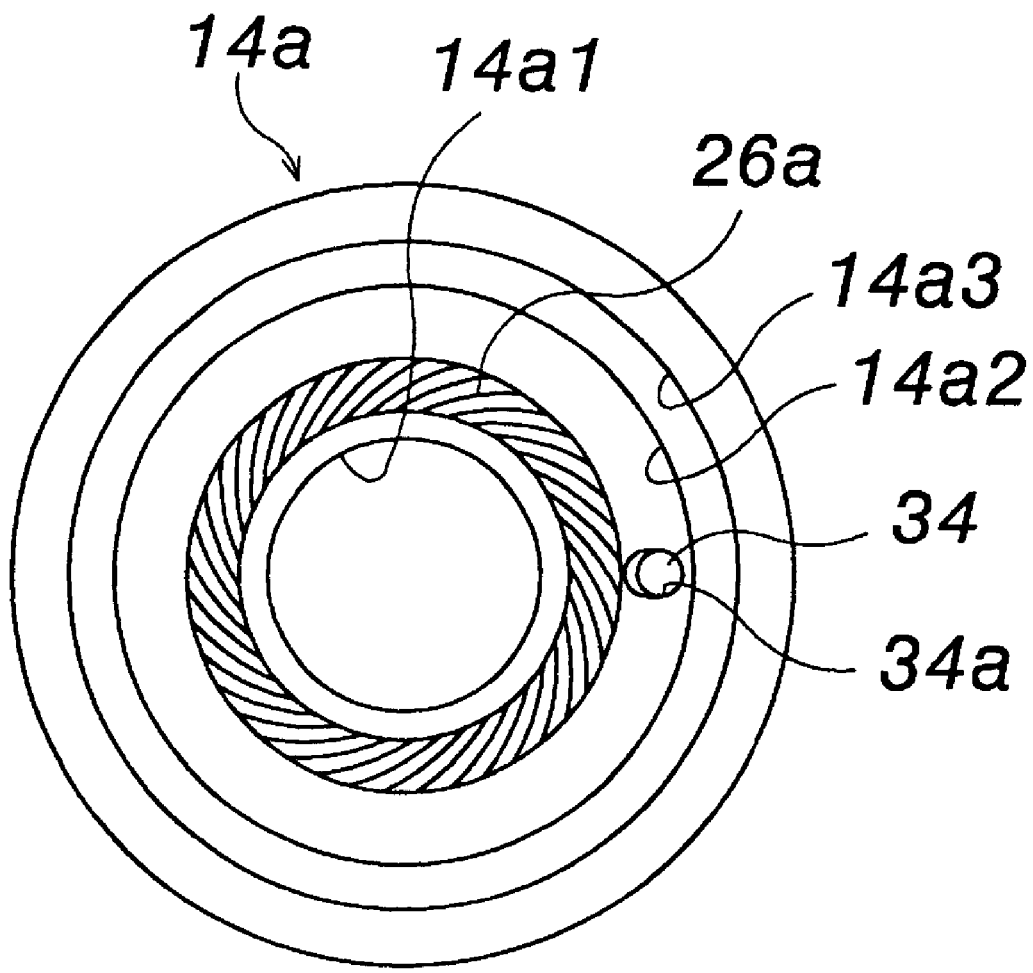
FIG. 4 is a plan view of an upper thrust bearing from the spindle motor shown in FIG. 1.
Figure 5:
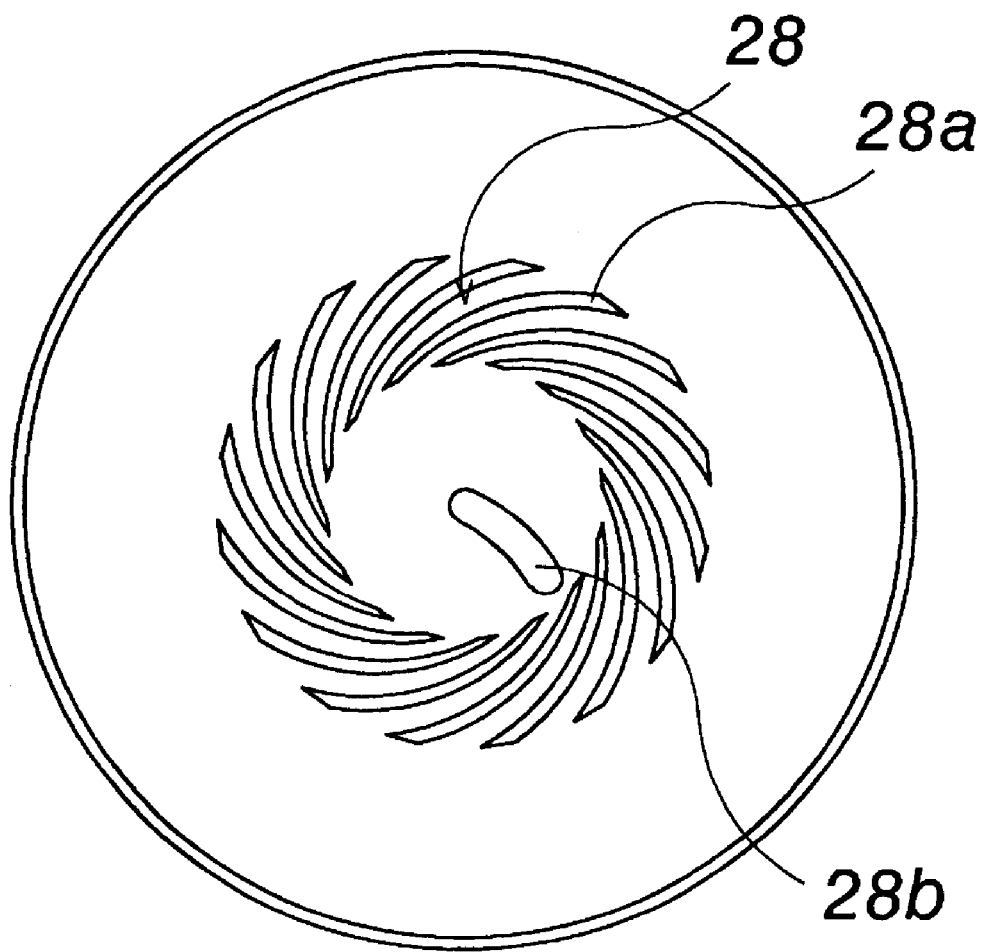
FIG. 5 is a plan view of a lower thrust bearing from the spindle motor shown in FIG. 1.

Pump-in type spiral grooves 26a as shown in FIG. 4 are formed as dynamic-pressure generating grooves along the inner circumferential margin of the sleeve 14 lower surface axially opposing the thrust plate 12b upper surface This composes an upper thrust bearing 26. Meanwhile, pump-in type spiral grooves 28a as shown in FIG. 5 are formed as dynamic-pressure generating grooves in a ring-shaped area in the counter-plate 14b upper surface axially opposing the thrust plate 12b lower surface Likewise as with the upper thrust bearing 26, this composes a lower thrust bearing 28. When the rotary shaft part 12 rotates, the spiral grooves 26a and 28a generate dynamic pressure that acts on the oil V retained in the upper and lower thrust bearings 26 and 28. The dynamic-pressure generating action of the grooves 26a and 28a is such that the pressure grows higher heading radially inward.

The clearance between the thrust plate 12b upper surface and the axially opposing sleeve 14 lower surface is narrower in the ring-shaped locus corresponding to the upper thrust bearing 26—where the two surfaces confront in parallel—than radially outward of the locus. Proceeding radially outward beyond the locus, the clearance at which the two surfaces confront is structured to widen axially, then remain thus widened.

Likewise, the clearance between the thrust plate 12b lower surface and the axially opposing counter-plate 14b upper surface is narrower in the ring-shaped locus corresponding to the lower thrust bearing 28—where the two surfaces confront in parallel—than radially outward of the locus. Proceeding radially outward beyond the locus, the clearance at which the two surfaces confront is structured to widen axially, then remain thus widened.

Then, oil V continuously fills the gaps: from that in the lower radial bearing 22 to begin with, to that in the upper thrust bearing 26 comprising the thrust plate 12b top and outer circumferential surfaces, and to that in the lower thrust bearing 28 comprising the under surface of the thrust plate 12b.

When the rotary shaft part 12 rotates, the spiral grooves 26a generate radially inward acting dynamic pressure in the oil V retained in the upper thrust bearing 26. The shaft 12a, because it is located on the rotational center of the thrust plate 12b, however, obstructs action of the spiral grooves 26a radially inwardly on the oil V. On the other hand, the herringbone grooves 22a, axially unbalanced as described earlier, are formed to generate a pressure peak near the axial lower end of the lower radial bearing 22—that is, neighboring the upper thrust bearing 26. Meanwhile oil Vis retained continuously in between the lower radial bearing 22 and the upper thrust bearing 26. Consequently, the mutual action of these two bearings generates an oil-pressure peak region nearby the boundary between the lower radial bearing 22 and the upper thrust bearing 26. Accordingly, the lower radial bearing 22 and the upper thrust bearing 26 collaborate to generate the dynamic pressure needed to support the rotary shaft part 12.

In contrast, in the lower thrust bearing 28, an oil-compression action radially inward, arising from the spiral grooves 28a, generates an oil pressure peak region nearby the rotational center of the shaft 12a. The form that the oil pressure distribution arising from the spiral grooves 28a alone assumes is roughly symmetrical with respect to the axial center.

A circularly arcuate auxiliary groove 28b is furnished in the bearing center of the lower thrust bearing 28 (an area that matches the rotational center of the rotary shaft part 12). As shown in FIG. 5, the auxiliary groove 28b is disposed radially inward of the spiral grooves 28a, extending radially outward from the axial center.

When the rotary shaft part 12 rotates, the auxiliary groove 28b induces dynamic pressure that, as the spiral grooves 28a do, compresses the oil V toward the bearing center. That is, from where the outer end of the auxiliary groove 28b is positioned, the distribution form of the dynamic pressure in the lower thrust bearing 28 becomes asymmetrical with respect to the axial center. This asymmetrical pressure distribution is due to the dynamic pressure generated by the auxiliary groove 28b in addition the dynamic pressure generated by the spiral grooves 28a. Therefore, though air bubbles develop around the central portion of the thrust plate 12b lower surface, they get sent conversely to the spiral grooves along the pressure gradient at which the auxiliary groove 28b generates dynamic pressure in the oil. In the spiral grooves is a pressure distribution according to which the oil dynamic pressure gradually reduces from the inner margin to the outer margin. Since air bubbles by nature will shift from a region of high to a region of low oil pressure, ultimately the air bubbles are exhausted to the outer circumferential region of the lower thrust bearing 28. The air bubbles are then sent in turn to the low-pressure outer circumferential area of the thrust plate 12b i.e., where the axial clearance between the thrust plate 12b lower surface and counter-plate 14b upper surface widens, as described earlier.

An axially extending breathing hole 34, as FIG. 2 illustrates, is furnished in the sleeve 14. One end of the breathing hole 34 is located at the circumferential margin of the upper thrust bearing 26, and the other end is open to the external atmosphere. Air bubbles sent toward the outer peripheral area of the upper thrust plate 12b exhaust to the external atmosphere through the breathing hole 34.

Figure 6:
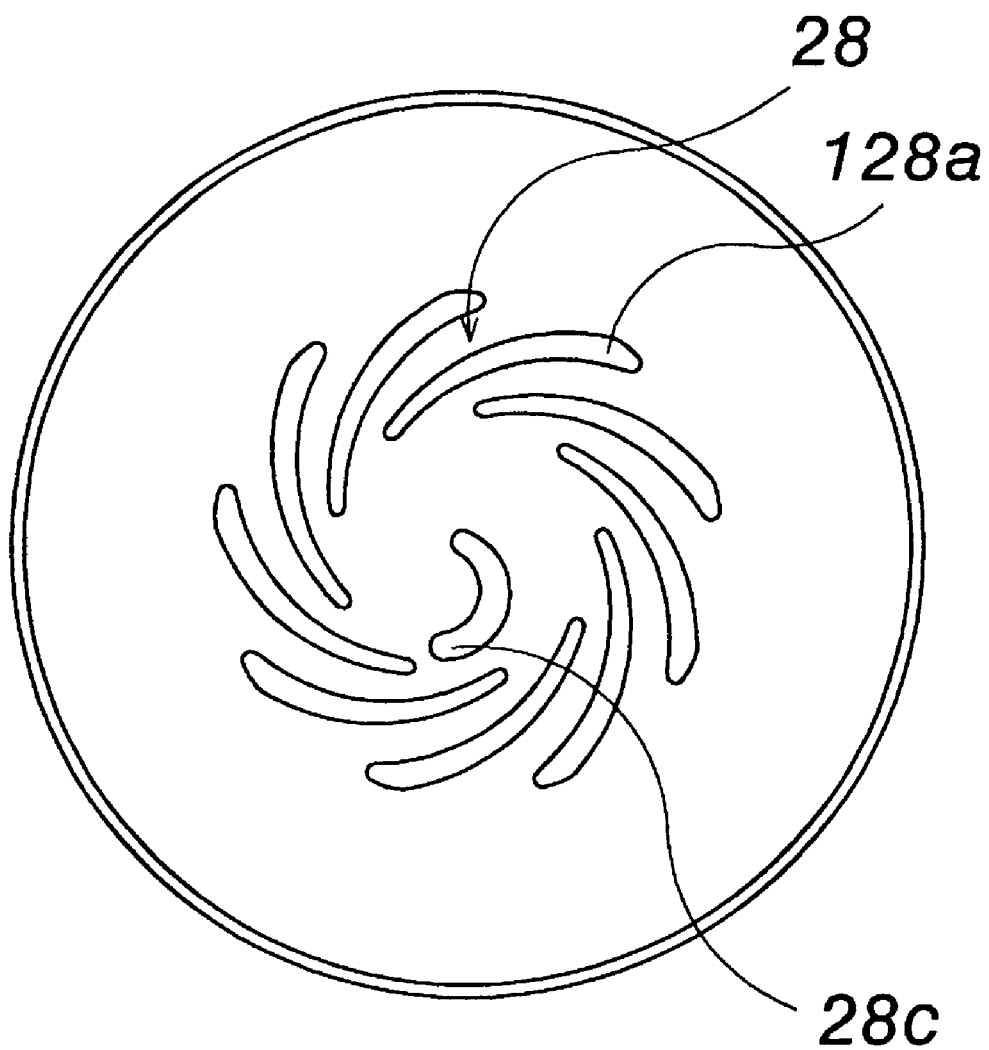
FIG. 6 is a plan view illustrating an example variation of the lower thrust bearing shown in FIG. 5.
Figure 7:
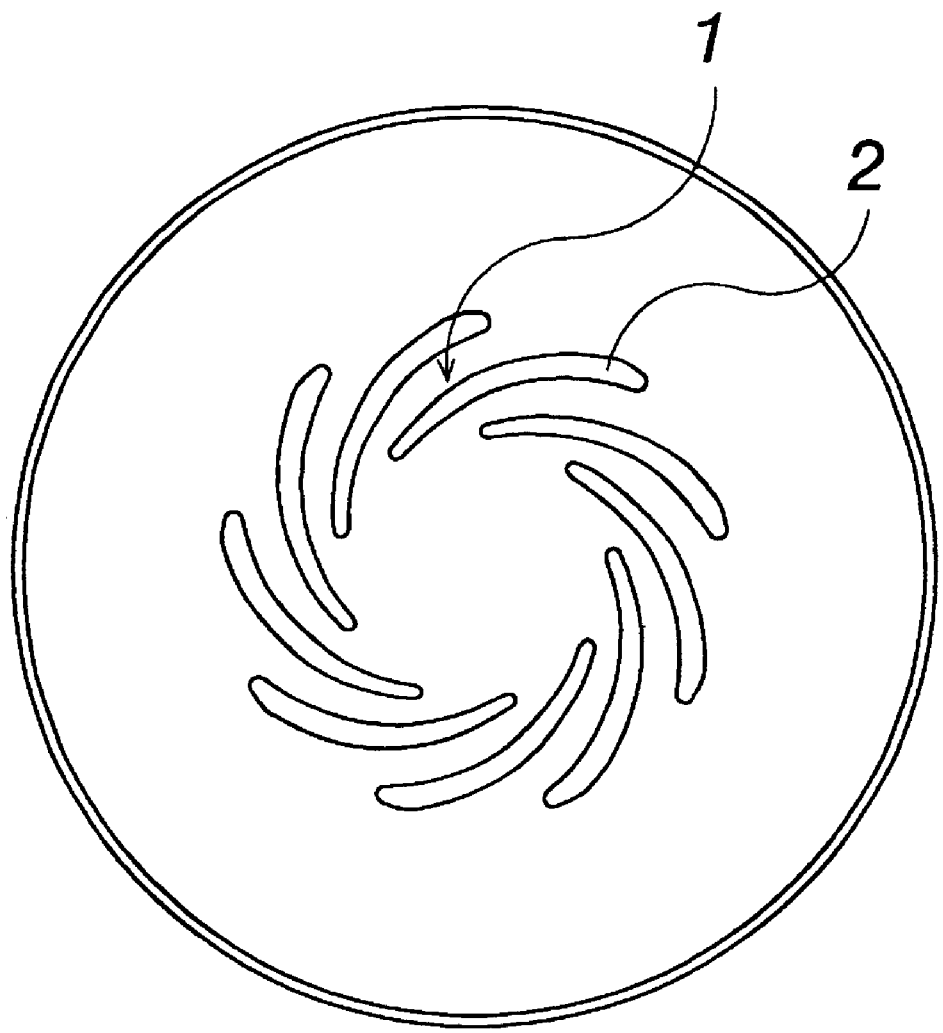
FIG. 7 is a plan view illustrating dynamic pressure generating grooves formed in a conventional thrust hydrodynamic bearing for generating dynamic pressure.

With regard to the configuration of the auxiliary groove, as shown in FIG. 6, an arcuate groove 28c of greater curvature than that of the auxiliary groove 28b is feasible. The auxiliary groove 28b is extended toward the inner margin of part of the spiral grooves 128a to be effective in sending air bubbles there. Since the crucial point is, with a dynamic-pressure groove asymmetrical with respect to the axial center, to make the generated dynamic pressure distribution asymmetrical with respect to the axial center, various configurations are feasible.

Furthermore, in the spindle motor embodiment illustrated in FIGS. 1 and 2, as already explained, an oil-pressure peak region is generated near the boundary between the lower radial bearing 22 and the upper thrust bearing 26. Accordingly, should air bubbles develop in the oil present therein, the bubbles will shift to a region where the oil pressure is lower. Consequently, air bubbles arising on the lower radial-bearing end will be sent from the oil-pressure peak region just noted, toward the radial gap enlargement 18, and exhausted through the intermediate vent hole 19 to the external atmosphere. Meanwhile, air bubbles arising on the upper thrust-bearing end will shift from the aforementioned oil-pressure peak region across the upper surface of the thrust plate 12b, and reach the thrust plate outer circumferential gap. From there, the air bubbles will exhaust through the breathing hole 34 to the external atmosphere.

A bearing configured in the foregoing manner functions to exhaust air bubbles; moreover, the present invention is the realization of spiral grooves formed on the lower surface of the thrust plate 12b functioning to exhaust air bubbles more completely from the thrust bearing.

While embodiments of the invention in a thrust dynamic-pressure bearing, and spindle motor furnished therewith, have been explained above, the present invention is not limited to these embodiments. Various changes and modifications can be made to the embodiments herein set forth, without departing from the scope of the invention.

For example, in the foregoing embodiments, the configuration is furnished with only one auxiliary groove 28b or 28c. A plurality of auxiliary grooves 28b/28c may be furnished, however, or the auxiliary groove(s) may be provided unitarily with the spiral grooves 28a. Such alternative configurations are possible, as long as with the dynamic-pressure groove(s) asymmetrical with respect to the axial center, the generated dynamic pressure distribution is made asymmetrical with respect to the axial center.

In the foregoing embodiments, the spiral grooves are formed on the lower end surface of the sleeve and on the counter-plate. Given that, an auxiliary groove(s) can be formed on the surface opposing the counter-plate/spiral grooves, i.e. the thrust plate lower surface, as another example of a variation.

What is claimed is:

1. A thrust dynamic pressure bearing comprising:

a disk-shaped thrust plate;

a counter-plate opposing, via an axial gap with, a planar surface of said thrust plate;

oil retained within said axial gap, defined between said thrust plate and said counter-plate;

dynamic-pressure generating grooves for generating dynamic pressure in said oil, said dynamic-pressure generating grooves being arranged circumferentially alongside one another as pump-in type spiral grooves for inducing in the dynamic pressure a pressure peak in the center of said thrust plate; and an auxiliary groove disposed such that the dynamic pressure generated by said spiral grooves is not, in distribution form, symmetrical with respect to the thrust dynamic pressure bearing axial center.

2. A thrust dynamic pressure bearing as set forth in claim 1, wherein:

said auxiliary groove is positioned radially inward of said spiral grooves; and said auxiliary groove is oriented to be asymmetrical with respect to the axial center, and to have a radially outward end from which said auxiliary groove extends to an end thereof closer to the bearing center.

3. A thrust dynamic pressure bearing as set forth in claim 2, further comprising a communication hole for communicating said thrust plate along its outer periphery with the bearing exterior.

4. A thrust dynamic pressure bearing as set forth in claim 1, wherein:

said auxiliary groove is formed asymmetrical with respect to the axial center, by extending radially inward an inward end of said spiral grooves.

5. A thrust dynamic pressure bearing as set forth in claim 4, further comprising a communication hole for communicating said thrust plate along its outer periphery with the bearing exterior.

6. A thrust dynamic pressure bearing as set forth in claim 1, further comprising a communication hole for communicating said thrust plate along its outer periphery with the bearing exterior.

7. A spindle motor comprising:

the thrust dynamic pressure bearing as set forth in claims 1, 2, 4 or 6;

a shaft, one end of which is formed coaxially and unitarily with said thrust plate;

a hollow circular cylindrical sleeve encompassing said shaft and said thrust plate circumferentially via a gap, wherein said thrust plate is located in one end of said sleeve and said end is closed off by said counter-plate;

oil retained within a gap defined between said sleeve along its inner circumferential surface and said shaft along its outer circumferential surface;and a radial bearing having dynamic-pressure generating grooves for inducing dynamic pressure in said oil.

8. A disk drive in which is installed at least one disk-shaped recording medium onto which information can be recorded, the disk drive comprising: a housing;

a spindle motor for rotating the recording medium, said spindle motor fixed within said housing and being a motor as set forth in claim 7; and an information accessing means for writing in and reading out information in requisite locations on the recording medium.

* * * * *